(12) United States Patent
Kim et al.

(10) Patent No.: US 9,771,476 B2
(45) Date of Patent: Sep. 26, 2017

(54) POLYCARBONATE RESIN COMPOSITION AND MOLDED ARTICLE USING THE SAME

(71) Applicant: Samsung SDI Co., Ltd., Yongin-si (KR)

(72) Inventors: In Chol Kim, Uiwang-si (KR); Jung Woo Park, Uiwang-si (KR); Kee Hae Kwon, Uiwang-si (KR); Chang Min Hong, Uiwang-si (KR)

(73) Assignee: Lotte Advanced Materials Co., Ltd., Yongin-si (KR)

( * ) Notice: Subject to any disclaimer, the term of this patent is extended or adjusted under 35 U.S.C. 154(b) by 0 days.

(21) Appl. No.: 15/133,510

(22) Filed: Apr. 20, 2016

(65) Prior Publication Data

US 2016/0312026 A1 Oct. 27, 2016

(30) Foreign Application Priority Data

Apr. 24, 2015 (KR) ........................ 10-2015-0058053

(51) Int. Cl.
*C08L 69/00* (2006.01)
*C08L 55/02* (2006.01)

(52) U.S. Cl.
CPC .................................... *C08L 69/00* (2013.01)

(58) Field of Classification Search
CPC .................................. C08L 69/00; C08L 55/02
See application file for complete search history.

(56) References Cited

U.S. PATENT DOCUMENTS

| 8,871,858 B2 | 10/2014 | Volkers et al. |
| 2003/0060565 A1* | 3/2003 | Eichenauer ........... C08F 279/02 525/67 |
| 2010/0160481 A1* | 6/2010 | Shin ........................ C08L 33/08 523/105 |

FOREIGN PATENT DOCUMENTS

| CN | 104004331 | * | 8/2014 |
| KR | 10-2009-0013211 A | | 2/2009 |

* cited by examiner

*Primary Examiner* — David Buttner
(74) *Attorney, Agent, or Firm* — Additon, Higgins & Pendleton, P.A.

(57) ABSTRACT

A polycarbonate resin composition and a molded article manufactured using the same. The polycarbonate resin composition includes: (A) a polycarbonate resin; (B) a vinyl cyanide compound-aromatic vinyl compound copolymer; (C) an acrylonitrile-butadiene-styrene graft copolymer including (C-1) a first acrylonitrile-butadiene-styrene graft copolymer, a rubbery polymer of which has an average particle diameter of about 200 nm to about 350 nm and (C-2) a second acrylonitrile-butadiene-styrene graft copolymer, a rubbery polymer of which has an average particle diameter of about 400 nm to about 600 nm; and (D) a compatibilizer.

14 Claims, No Drawings

POLYCARBONATE RESIN COMPOSITION AND MOLDED ARTICLE USING THE SAME

CROSS-REFERENCE TO RELATED APPLICATION

This application claims priority to and the benefit of Korean Patent Application No. 10-2015-0058053, filed on Apr. 24, 2015, in the Korean Intellectual Property Office, the entire disclosure of which is incorporated herein by reference.

FIELD

The present invention relates to a polycarbonate resin composition and a molded article manufactured using the same.

BACKGROUND

Polycarbonate is an engineering plastic widely used in the plastics industry.

Polycarbonate can have a glass transition temperature of about 150° C. by virtue of a bulky molecular structure, such as bisphenol A, and thus can exhibit high thermal resistance. Also, a carbonyl group of a carbonate group has high rotational mobility and thus can impart flexibility and stiffness to polycarbonate. In addition, polycarbonate is an amorphous polymer having superior transparency and exhibits excellent properties in terms of impact resistance and compatibility with other resins. However, polycarbonate has poor flowability and is often used in the form of alloys with various resins to complement workability and post-processability.

Among these alloys, a polycarbonate/acrylonitrile-butadiene-styrene copolymer (PC/ABS) alloy can have excellent properties in terms of durability, thermal resistance, and impact resistance and is used in various fields such as electrical/electronic products, automotive components, construction materials, and other real-world materials.

However, such a PC/ABS alloy is likely to be discolored by heat and has poor UV stability. Thus, a molded article manufactured using the PC/ABS alloy is rarely used as a component without being subjected to an appropriate post-processing process such as plating, painting, and wet transferring. For example, painting allows realization of various colors and is relatively inexpensive, as compared with other post-processing processes, and accordingly is the most common post-process.

Generally, painting sequentially includes molding a component, etching a surface of the component, application/drying of a painting solution to the component, and coating. Here, since the painting solution generally includes an organic compound solvent, defects of the component generated during a molding process such as injection molding, i.e. abnormal appearance including surface defects and surface welds or flow marks, can become more prominent after painting. In addition, residual stress on the component after molding can cause painting defects due to the organic compound solvent.

Surface cracks, erosion, and non-uniformity in appearance after painting caused by such abnormal appearance and painting defects can be partly improved through additional processes. Introduction of the additional processes, however, is not a fundamental solution since the additional processes increase complexity of the overall process and can only provide slight improvement.

Therefore, in order to overcome these problems, the present inventors have conducted a study for preparing an improved polycarbonate resin composition which can exhibit excellent paintability while maintaining superior properties of a PC/ABS alloy, such as impact resistance, by improving paintability of a material itself.

SUMMARY OF THE INVENTION

Exemplary embodiments provide a polycarbonate resin composition which can improve compatibility between a polycarbonate resin and an acrylonitrile-butadiene-styrene (ABS) copolymer resin to improve paintability, thereby allowing a resulting molded article to exhibit excellent properties in terms of appearance after painting, and impact resistance, and a molded article manufactured using the same.

Exemplary embodiments provide a polycarbonate resin composition which includes acrylonitrile-butadiene-styrene graft copolymers, rubbery polymers of which have different average particle diameters, in a predetermined weight ratio and thus can provide excellent paintability and impact resistance, and a molded article manufactured using the same.

A polycarbonate resin composition may include: (A) a polycarbonate resin; (B) a vinyl cyanide compound-aromatic vinyl compound copolymer; (C) an acrylonitrile-butadiene-styrene graft copolymer including (C-1) a first acrylonitrile-butadiene-styrene graft copolymer, a rubbery polymer of which has an average particle diameter of about 200 nm to about 350 nm and (C-2) a second acrylonitrile-butadiene-styrene graft copolymer, a rubbery polymer of which has an average particle diameter of about 400 nm to about 600 nm; and (D) a compatibilizer.

The polycarbonate resin composition may include about 45 wt % to about 75 wt % of the polycarbonate resin (A); about 10 wt % to about 40 wt % of the vinyl cyanide compound-aromatic vinyl compound copolymer (B); about 10 wt % to about 25 wt % of the acrylonitrile-butadiene-styrene graft copolymer (C); and about 3 wt % to about 9 wt % of the compatibilizer (D).

The acrylonitrile-butadiene-styrene graft copolymer (C) may include the first acrylonitrile-butadiene-styrene graft copolymer (C-1) and the second acrylonitrile-butadiene-styrene graft copolymer (C-2) in a weight ratio of about 1:0.1 to about 1:1.

In the vinyl cyanide compound-aromatic vinyl compound copolymer (B), the vinyl cyanide compound may be selected from the group consisting of acrylonitrile, methacrylonitrile, fumaronitrile, and combinations thereof.

In the vinyl cyanide compound-aromatic vinyl compound copolymer (B), the aromatic vinyl compound may be selected from the group consisting of styrene, α-methylstyrene, halogen and/or alkyl-substituted styrene, and combinations thereof.

The vinyl cyanide compound-aromatic vinyl compound copolymer (B) may be a styrene-acrylonitrile copolymer (SAN).

The vinyl cyanide compound-aromatic vinyl compound copolymer can be copolymerized from a mixture of the aromatic vinyl compound and the vinyl cyanide compound in which the aromatic vinyl compound is present in an amount of about 60 wt % to about 80 wt %, based on the total weight of the mixture.

The vinyl cyanide compound-aromatic vinyl compound copolymer (B) may have a weight average molecular weight of about 70,000 g/mol to about 400,000 g/mol.

The second acrylonitrile-butadiene-styrene graft copolymer (C-2) may be present in an amount of about 1 wt % to about 10 wt % based on the total weight of the polycarbonate resin composition.

The compatibilizer (D) may include a (meth)acrylic copolymer which is a copolymer of a (meth)acrylic compound and a compound copolymerizable with the (meth)acrylic compound.

The compatibilizer (D) may include a copolymer of ethyl acrylate and methyl methacrylate.

The compatibilizer (D) may include a (meth)acrylic copolymer copolymerized from a mixture including about 30 wt % to about 70 wt % of ethyl acrylate and about 70 wt % to about 30 wt % of methyl methacrylate.

In exemplary embodiments, a molded article may be manufactured from the polycarbonate resin composition as set forth above.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and a thorough understanding of the present invention by those skilled in the art. The scope of the present invention should be defined only by the appended claims.

Unless otherwise defined herein, all terms including technical or scientific terms used herein have the same meanings as commonly understood by those skilled in the art to which the present invention pertains. It will be further understood that terms, such as those defined in commonly used dictionaries, should not be interpreted in an idealized or overly formal sense unless expressly so defined herein.

Hereinafter, embodiments of the present invention will be described in detail.

In accordance with exemplary embodiments, a polycarbonate resin composition includes a polycarbonate resin, a vinyl cyanide compound-aromatic vinyl compound copolymer, an acrylonitrile-butadiene-styrene graft copolymer, and a compatibilizer.

Now, each component of the polycarbonate resin composition according to the present invention will be described in more detail.

(A) Polycarbonate Resin

The polycarbonate resin (A) is a polyester containing a carbonate bond and may include any polycarbonate resin available in the field of resin compositions without limitation.

For example, the polycarbonate resin may be prepared by reacting a compound including phosgene, halogen acid ester, and/or carbonic acid ester with one or more diphenols represented by Formula 1:

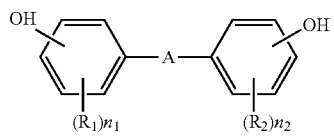

wherein: A is a linkage group selected from the group consisting of a single bond, a substituted or unsubstituted linear or branched $C_1$ to $C_{30}$ alkylene group, a substituted or unsubstituted $C_2$ to $C_5$ alkenylene group, a substituted or unsubstituted $C_2$ to $C_5$ alkylidene group, a substituted or unsubstituted linear or branched $C_1$ to $C_{30}$ haloalkylene group, a substituted or unsubstituted $C_5$ to $C_6$ cycloalkylene group, a substituted or unsubstituted $C_5$ to $C_6$ cycloalkenylene group, a substituted or unsubstituted $C_5$ to $C_{10}$ cycloalkylidene group, a substituted or unsubstituted $C_6$ to $C_{30}$ arylene group, a substituted or unsubstituted linear or branched $C_1$ to $C_{20}$ alkoxylene group, a halogen acid ester group, a carbonic acid ester group, —CO—, —S—, and —SO$_2$—; $R_1$ and $R_2$ are the same or different and are each independently a substituted or unsubstituted $C_1$ to $C_{30}$ alkyl group or a substituted or unsubstituted $C_6$ to $C_{30}$ aryl group; and $n_1$ and $n_2$ are the same or different and are each independently an integer of 0 to 4.

As used herein, the term "substituted" means that a hydrogen atom in a functional group is substituted with a substituent selected from the group consisting of a halogen group, a $C_1$ to $C_{30}$ alkyl group, a $C_1$ to $C_{30}$ haloalkyl group, a $C_6$ to $C_{30}$ aryl group, a $C_1$ to $C_{20}$ alkoxy group, and combinations thereof.

At least two diphenols represented by Formula 1 are combined to form a repeat unit of the polycarbonate resin.

Examples of the diphenols may include without limitation hydroquinone, resorcinol, 4,4'-dihydroxyphenyl, 2,2-bis-(4-hydroxyphenyl)-propane (also referred to as "bisphenol A"), 2,4-bis-(4-hydroxyphenyl)-2-methylbutane, bis(4-hydroxyphenyl)-methane, 1,1-bis-(4-hydroxyphenyl)-cyclohexane, 2,2-bis-(3-chloro-4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, bis(4-hydroxyphenyl)-sulfoxide, bis(4-hydroxyphenyl)-ketone, bis(4-hydroxyphenyl)-ether, and the like, and combinations thereof. In exemplary embodiments, the diphenols may include 2,2-bis-(4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(3,5-dichloro-4-hydroxyphenyl)-propane, and/or 1,1-bis-(4-hydroxyphenyl)-cyclohexane. For example, the diphenol may include 2,2-bis-(4-hydroxyphenyl)-propane.

The polycarbonate resin may include a copolymer or a mixture of copolymers prepared from at least two different diphenols.

In addition, the polycarbonate resin may include a linear polycarbonate resin, a branched polycarbonate resin, and/or a polyester carbonate copolymer resin.

Examples of the linear polycarbonate resin may include a bisphenol A polycarbonate resin. Examples of the branched polycarbonate resin may include a resin prepared by reacting a polyfunctional aromatic compound such as trimellitic anhydride and trimellitic acid with diphenol and carbonate. The polyester carbonate copolymer resin may be prepared by reacting a bifunctional carboxylic acid with diphenol and carbonate, wherein the carbonate may be a diaryl carbonate such as diphenyl carbonate and/or ethylene carbonate.

The polycarbonate resin can have a weight average molecular weight of about 10,000 g/mol to about 200,000 g/mol, for example about 14,000 g/mol to about 40,000 g/mol. Within this range of weight average molecular weight, the polycarbonate resin composition can have excellent impact resistance and flowability. Further, in order to satisfy desired flowability, the polycarbonate resin may be a mixture of at least two polycarbonate resins having different weight average molecular weights.

The polycarbonate resin composition can include the polycarbonate resin in an amount of about 45% by weight (wt %) to about 75 wt %, for example about 50 wt % to about 70 wt %, based on the total weight (100 wt %) of the polycarbonate resin composition. In some embodiments, the polycarbonate resin composition can include the polycarbonate resin in an amount of about 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 wt %. Further, according to some embodiments of the present invention, the polycarbonate resin can be present in an amount of from about any of the foregoing amounts to about any other of the foregoing amounts.

Within this range, the resin composition can exhibit excellent properties in terms of appearance and mechanical strength.

(B) Vinyl Cyanide Compound-Aromatic Vinyl Compound Copolymer

The vinyl cyanide compound-aromatic vinyl compound copolymer (B) is obtained by copolymerization of a vinyl cyanide compound with an aromatic vinyl compound.

Examples of the vinyl cyanide compound may include without limitation acrylonitrile, methacrylonitrile, fumaronitrile, and the like, and combinations thereof.

Examples of the aromatic vinyl compound may include without limitation styrene, α-methylstyrene, halogen-substituted styrene, $C_1$ to $C_8$ alkyl-substituted styrene, and the like, and combinations thereof.

In exemplary embodiments, the vinyl cyanide compound-aromatic vinyl compound copolymer can be copolymerized from a mixture in which the aromatic vinyl compound is present in an amount of about 60 wt % to about 80 wt %, for example about 70 wt % to about 80 wt %, based on the total weight (100 wt %) of the vinyl cyanide compound and the aromatic vinyl compound.

The vinyl cyanide compound-aromatic vinyl compound copolymer may have a weight average molecular weight of about 70,000 g/mol to about 400,000 g/mol, for example about 80,000 g/mol to about 200,000 g/mol.

In exemplary embodiments, the vinyl cyanide compound-aromatic vinyl compound copolymer is a styrene-acrylonitrile copolymer (SAN).

The styrene-acrylonitrile copolymer may be formed by copolymerization of about 60 wt % to about 80 wt % of styrene with about 20 wt % to about 40 wt % of acrylonitrile, for example about 70 wt % to about 80 wt % of styrene with about 20 wt % to about 30 wt % of acrylonitrile.

In some embodiments, the styrene-acrylonitrile copolymer can include styrene in an amount of about 60, 61, 62, 63, 64, 65, 66, 67, 68, 69, 70, 71, 72, 73, 74, 75, 76, 77, 78, 79, or 80 wt %. Further, according to some embodiments of the present invention, styrene can be present in an amount of from about any of the foregoing amounts to about any other of the foregoing amounts.

In some embodiments, the styrene-acrylonitrile copolymer can include acrylonitrile in an amount of about 20, 21, 22, 23, 24, 25, 26, 27, 28, 29, 30, 31, 32, 33, 34, 35, 36, 37, 38, 39, or 40 wt %. Further, according to some embodiments of the present invention, acrylonitrile can be present in an amount of from about any of the foregoing amounts to about any other of the foregoing amounts.

When each monomer of the styrene-acrylonitrile copolymer is present in an amount in the above range, the polycarbonate resin composition can exhibit improved impact resistance while considerably improving appearance of a molded article formed therefrom.

The polycarbonate resin composition can include the vinyl cyanide compound-aromatic vinyl compound copolymer in an amount of about 10 wt % to about 40 wt %, for example about 15 wt % to about 35 wt %, based on the total weight (100 wt %) of the polycarbonate resin composition. In some embodiments, the polycarbonate resin composition can include the vinyl cyanide compound-aromatic vinyl compound copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the vinyl cyanide compound-aromatic vinyl compound copolymer can be present in an amount of from about any of the foregoing amounts to about any other of the foregoing amounts.

Within this range, the vinyl cyanide compound-aromatic vinyl compound copolymer can exhibit better properties in terms of compatibility with the polycarbonate resin and paintability.

(C) Acrylonitrile-Butadiene-Styrene Graft Copolymer

The acrylonitrile-butadiene-styrene graft copolymer (C) may have a core-shell structure which includes a core formed of a butadiene-based rubbery polymer and a shell formed by grafting acrylonitrile and styrene around the core.

The rubbery polymer constituting the core improves impact strength at low temperature, and the shell is located at an interface between a continuous phase, for example, the vinyl cyanide compound-aromatic vinyl compound copolymer and the rubbery polymer to lower interfacial tension, thereby reducing the size of rubbery polymer particles of a dispersive phase while improving adhesion at the interface.

The acrylonitrile-butadiene-styrene graft copolymer (C) may include two acrylonitrile-butadiene-styrene graft copolymers, the rubbery polymers of which have different average particle diameters.

For convenience, the two acrylonitrile-butadiene-styrene graft copolymers will be referred to as "first acrylonitrile-butadiene-styrene graft copolymer" (C-1) and "second acrylonitrile-butadiene-styrene graft copolymer" (C-2), respectively.

Although the particle diameter may be represented as an average size of a group through quantification using a measurement method, a general representation of the particle diameter may include a mode diameter representing a maximum value of a distribution, a median diameter corresponding to a median value of an integral distribution curve, various average diameters (number average, length average, area average, mass average, volume average diameters, and the like), and the like. Unless otherwise stated, the particle diameter as used herein refers to D50 (a diameter at a distribution rate of 50%) which is a number average particle diameter.

The acrylonitrile-butadiene-styrene graft copolymer (C) may be prepared by grafting styrene and acrylonitrile to a butadiene-based rubbery polymer through a typical polymerization method such as emulsion polymerization and bulk polymerization.

In the first acrylonitrile-butadiene-styrene graft copolymer (C-1), the rubbery polymer may have an average particle diameter of about 200 nm to about 350 nm, for example about 250 nm to about 350 nm.

The first acrylonitrile-butadiene-styrene graft copolymer (C-1) may include about 10 wt % to about 60 wt % of the butadiene-based rubbery polymer, about 20 wt % to about 80 wt % of styrene, and about 5 wt % to about 45 wt % of acrylonitrile, each based on the total weight (100 wt %) of the first acrylonitrile-butadiene-styrene graft copolymer (C-1).

In some embodiments, the first acrylonitrile-butadiene-styrene graft copolymer (C-1) can include the butadiene-based rubbery polymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments of the present invention, the butadiene-based rubbery polymer can be present in an amount of from about any of the foregoing amounts to about any other of the foregoing amounts.

In some embodiments, the first acrylonitrile-butadiene-styrene graft copolymer (C-1) can include styrene in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, styrene can be present in an amount of from about any of the foregoing amounts to about any other of the foregoing amounts.

In some embodiments, the first acrylonitrile-butadiene-styrene graft copolymer (C-1) can include acrylonitrile in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 wt %. Further, according to some embodiments of the present invention, acrylonitrile can be present in an amount of from about any of the foregoing amounts to about any other of the foregoing amounts.

In the second acrylonitrile-butadiene-styrene graft copolymer (C-2), the rubbery polymer may have an average particle diameter of about 400 nm to about 600 nm, for example about 450 nm to about 550 nm.

The second acrylonitrile-butadiene-styrene graft copolymer (C-2) may include about 10 wt % to about 60 wt % of the butadiene-based rubbery polymer, about 20 wt % to about 80 wt % of styrene, and about 5 wt % to about 45 wt % of acrylonitrile, each based on the total weight (100 wt %) of the second acrylonitrile-butadiene-styrene graft copolymer (C-2).

In some embodiments, the second acrylonitrile-butadiene-styrene graft copolymer (C-2) can include the butadiene-based rubbery polymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments of the present invention, the butadiene-based rubbery polymer can be present in an amount of from about any of the foregoing amounts to about any other of the foregoing amounts.

In some embodiments, the second acrylonitrile-butadiene-styrene graft copolymer (C-2) can include styrene in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, styrene can be present in an amount of from about any of the foregoing amounts to about any other of the foregoing amounts.

In some embodiments, the second acrylonitrile-butadiene-styrene graft copolymer (C-2) can include acrylonitrile in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 wt %. Further, according to some embodiments of the present invention, acrylonitrile can be present in an amount of from about any of the foregoing amounts to about any other of the foregoing amounts.

The acrylonitrile-butadiene-styrene graft copolymer (C) may include the first acrylonitrile-butadiene-styrene graft copolymer (C-1) and the second acrylonitrile-butadiene-styrene graft copolymer (C-2) in a weight ratio of about 1:0.1 to about 1:1 (C-1:C-2), for example about 1:0.1 to 1:0.7. Within this range of weight ratio, the polycarbonate resin can exhibit excellent compatibility with the acrylonitrile-butadiene-styrene copolymer.

The polycarbonate resin composition can include the acrylonitrile-butadiene-styrene graft copolymer (C) in an amount of about 10 wt % to about 25 wt %, based on the total weight (100 wt %) of the polycarbonate resin composition. In some embodiments, the polycarbonate resin composition can include the acrylonitrile-butadiene-styrene graft copolymer (C) in an amount of about 10, 11, 12, 13, 14, 15, 16, 17, 18, 19, 20, 21, 22, 23, 24, or 25 wt %. Further, according to some embodiments of the present invention, the acrylonitrile-butadiene-styrene graft copolymer (C) can be present in an amount of from about any of the foregoing amounts to about any other of the foregoing amounts.

The polycarbonate resin composition may include the second acrylonitrile-butadiene-styrene graft copolymer (C-2), the butadiene-based rubbery polymer of which has a particle diameter of about 450 nm to about 600 nm, in an amount of about 1 wt % to about 10 wt %, for example about 1 wt % to about 6 wt %, based on the total weight (100 wt %) of the polycarbonate resin composition. In some embodiments, the polycarbonate resin composition can include the second acrylonitrile-butadiene-styrene graft copolymer (C-2) in an amount of about 1, 2, 3, 4, 5, 6, 7, 8, 9, or 10 wt %. Further, according to some embodiments of the present invention, the second acrylonitrile-butadiene-styrene graft copolymer (C-2) can be present in an amount of from about any of the foregoing amounts to about any other of the foregoing amounts.

Within this range, the polycarbonate resin composition can exhibit excellent paintability.

(D) Compatibilizer

The compatibilizer (D) serves to increase compatibility between the components of the polycarbonate resin composition and may include a (meth)acrylic copolymer obtained by copolymerization of a (meth)acrylic compound with a compound copolymerizable with the (meth)acrylic compound.

The (meth)acrylic copolymer includes at least one (meth) acrylic compound as a repeat unit and may be obtained by copolymerization of a (meth)acrylic compound with an aromatic vinyl compound copolymerizable with the (meth) acrylic compound, a second (meth)acrylic compound different from the (meth)acrylic compound, a heterocyclic compound, or a combination thereof. In exemplary embodiments, the (meth)acrylic copolymer is a copolymer of two different types of (meth)acrylic compounds.

Examples of the (meth)acrylic compound may include without limitation alkyl (meth)acrylic acid esters, (meth) acrylic acid esters, and the like, and combinations thereof. As used here, the term alkyl refers to a $C_1$ to $C_{10}$ alkyl. Examples of the alkyl (meth)acrylic acid ester may include without limitation methyl methacrylate, ethyl methacrylate, propyl methacrylate, butyl methacrylate, and the like, and combinations thereof. In exemplary embodiments, the (meth)acrylic compound includes methyl methacrylate.

The heterocyclic compound may be a substituted or unsubstituted $C_2$ to $C_{20}$ heterocycloalkyl compound, a substituted or unsubstituted $C_2$ to $C_{20}$ heterocycloalkenyl compound, and/or a substituted or unsubstituted $C_2$ to $C_{20}$ heterocycloalkynyl compound. Examples of the heterocyclic compound may include without limitation maleic anhydride, $C_1$ to $C_{10}$ alkyl N-substituted maleimide, phenyl N-substituted maleimide, and the like, and combinations thereof.

In exemplary embodiments, the (meth)acrylic copolymer is a copolymer of methyl methacrylate and ethyl acrylate.

In exemplary embodiments, the (meth)acrylic copolymer may be copolymerized from the mixture including about 30 wt % to about 70 wt % of methyl methacrylate and about 70 wt % to about 30 wt % of ethyl acrylate.

In some embodiments, the mixture of methyl methacrylate and ethyl acrylate can include methyl methacrylate in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, methyl methacrylate can be present in an amount of from about any of the foregoing amounts to about any other of the foregoing amounts.

In some embodiments, the mixture of methyl methacrylate and ethyl acrylate can include ethyl acrylate in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, ethyl acrylate can be present in an amount of from about any of the foregoing amounts to about any other of the foregoing amounts.

Within this range of weight ratio, the (meth)acrylic copolymer can improve compatibility between the polycarbonate resin and the acrylonitrile-butadiene-styrene copolymer.

The (meth)acrylic copolymer may have a weight average molecular weight of about 100,000 g/mol to about 30,000,000 g/mol, for example about 1,000,000 g/mol to about 30,000,000 g/mol, as another example about 1,000,000 g/mol to about 10,000,000 g/mol, and as another example about 1,000,000 g/mol to about 7,000,000 g/mol. Within this range of weight average molecular weight of the (meth)acrylic copolymer, it is possible to stabilize morphology between the components of the resin composition with minimum or no deterioration in flowability of the resin composition in the range of shear rate during injection molding.

The (meth)acrylic copolymer may be used alone or as a mixture thereof.

The polycarbonate resin composition can include the compatibilizer in an amount of about 3 wt % to about 9 wt %, for example about 3 wt % to about 8 wt %, based on the total weight (100 wt %) of the polycarbonate resin composition. In some embodiments, the polycarbonate resin composition can include the compatibilizer (D) in an amount of about 3, 4, 5, 6, 7, 8, or 9 wt %. Further, according to some embodiments of the present invention, the compatibilizer (D) can be present in an amount of from about any of the foregoing amounts to about any other of the foregoing amounts.

If the amount of the compatibilizer is below about 3 wt %, the polycarbonate resin can exhibit poor compatibility with the acrylonitrile-butadiene-styrene copolymer, whereas if the amount of the compatibilizer exceeds about 8 wt %, the resin composition can have poor flowability causing deterioration in processability.

The polycarbonate resin composition may further include one or more additives, as needed. The additives may include without limitation flame retardants, lubricants, plasticizers, heat stabilizers, antioxidants, photostabilizers, and/or colorants. These additives may be used as a mixture thereof depending upon desired properties of a final molded article.

The flame retardants serve to reduce flammability and may include at least one of a phosphate compound, a phosphite compound, a phosphonate compound, polysiloxane, a phosphazene compound, a phosphinate compound, and/or a melamine compound, without being limited thereto.

The lubricants serve to lubricate a surface of a metal contacting the polycarbonate resin composition during processing, molding, and/or extrusion to facilitate flow and/or migration of the resin composition and may include any typical lubricants known in the art.

The plasticizers serve to increase flexibility, processability, and/or expansibility of the polycarbonate resin composition and may include any typical plasticizers known in the art.

The heat stabilizers serve to suppress pyrolysis of the polycarbonate resin composition in kneading and/or molding at high temperature and may include any typical heat stabilizers known in the art.

The antioxidants serve to suppress and/or block chemical reaction between the polycarbonate resin composition and oxygen, thereby preventing loss of inherent properties of the resin composition due to decomposition of the resin composition, and may include at least one of phenol-type, phosphite-type, thioether-type and/or amine-type antioxidants, without being limited thereto.

The photostabilizers serve to suppress and/or block discoloration and/or loss of mechanical properties of the polycarbonate resin composition due to decomposition caused by UV light and may include at least one of hindered phenol-type photostabilizers, benzophenone-type photostabilizers, and/or benzotriazole-type photostabilizers, without being limited thereto.

The colorants may include any typical pigments and/or dyes.

The additives may be present in an amount of about 1 part by weight to about 15 parts by weight based on about 100 parts by weight of the polycarbonate resin composition.

The polycarbonate resin composition according to the present invention may be prepared by any typical known method used in preparation of a resin composition. For example, the above components and, optionally, other additives can be mixed, followed by melt extrusion in an extruder, thereby preparing a resin composition in the form of pellets.

In accordance with exemplary embodiments, a molded article is formed from the polycarbonate resin composition as set forth above. The polycarbonate resin composition can exhibit excellent impact resistance and paintability and thus can be used in the production of a molded article requiring excellent impact resistance and paintability, for example, may be used as a material for the manufacture of interior/exterior components for vehicles.

Next, the present invention will be described in more detail with reference to the following examples. However, it should be noted that these examples are provided for illustration only and should not be construed in any way as limiting the invention.

EXAMPLES

Details of components used in the following Examples and Comparative Examples are as follows:

(a) Polycarbonate Resin

A polycarbonate resin having a weight average molecular weight of 20,000 g/mol (Samsung SDI) is used.

(b) Vinyl Cyanide Compound-Aromatic Vinyl Compound Copolymer

A styrene-acrylonitrile copolymer (SAN) resin obtained by copolymerization of mixture including 24 wt % of acrylonitrile and 76 wt % of styrene and having a weight average molecular weight of 150,000 g/mol (Samsung SDI) is used.

(c) Acrylonitrile-Butadiene-Styrene Graft Copolymer (c-1) First Acrylonitrile-Butadiene-Styrene Graft Copolymer An acrylonitrile-butadiene-styrene graft copolymer including 58 wt % of a polybutadiene rubbery polymer core and 42 wt % of a shell (Samsung SDI) is used. Here, the shell is obtained by graft-copolymerization of mixture including 75 wt % of styrene and 25 wt % of acrylonitrile, and the polybutadiene rubbery polymer has an average particle diameter of about 260 nm.

(c-2) Second Acrylonitrile-Butadiene-Styrene Graft Copolymer

An acrylonitrile-butadiene-styrene copolymer resin (Samsung SDI) obtained by bulk polymerization and including an acrylonitrile-butadiene-styrene graft copolymer including 12 wt % of polybutadiene rubbery polymer core and 10 wt % of styrene-acrylonitrile copolymer shell and 78 wt % of a styrene-acrylonitrile copolymer is used. In the acrylonitrile-butadiene-styrene graft copolymer, the polybutadiene rubbery polymer has an average particle diameter of about 500 nm; the shell is obtained by graft-copolymerization of mixture including 76 wt % of styrene and 24 wt % of acrylonitrile; and the styrene-acrylonitrile copolymer has a weight average molecular weight of 190,000 g/mol and is obtained by copolymerization of mixture including 76 wt % of styrene and 24 wt % of acrylonitrile.

(d) Compatibilizer

An ethyl acrylate-methyl methacrylate copolymer (Paraloid K125P, Dow Chemical) is used.

Polycarbonate resin compositions of the Examples and Comparative Examples are prepared according to amount ratios as listed in Table 1. The amount of each component is represented in % by weight (wt %) based on the total weight of the polycarbonate resin composition. Since (c-2) components used in the Examples and Comparative Examples included (C-2) and (B) components of the polycarbonate resin composition according to the invention, the amounts of the components used in the Examples and Comparative Examples are converted into amounts of (A), (B), (C-1), (C-2), and (D) components and are also shown in wt % in Table 1.

The components listed in Table 1 are dry-mixed and continuously introduced to a supply unit of a twin-screw type extruder (L/D=29, $\phi$=45 mm) in a consistent amount, followed by melting/kneading, thereby preparing pellets. Thereafter, the pelletized polycarbonate resin composition is dried at about 80° C. for about 2 hours, followed by injection molding using a 6 oz. injection machine at a cylinder temperature of about 260° C. and a mold temperature of about 60° C., thereby preparing a specimen for property evaluation and a specimen for paintability evaluation having a size of 20 cm×5 cm×0.2 cm.

TABLE 1

|  |  | Example | | | | | Comparative Example | | | | | | |
|---|---|---|---|---|---|---|---|---|---|---|---|---|---|
|  |  | 1 | 2 | 3 | 4 | 5 | 1 | 2 | 3 | 4 | 5 | 6 | 7 |
| Actual amount ratio | (a) | 50 | 50 | 70 | 50 | 50 | 50 | 50 | 50 | 50 | 85 | 30 | 50 |
|  | (b) | 23.5 | 14.5 | 10.5 | 18.5 | 16 | 31 | 11 | — | 26.5 | — | 43.5 | 31 |
|  | (c-1) | 13.5 | 18.5 | 9.5 | 13.5 | 11 | 16 | 6 | — | 13.5 | 12 | 13.5 | — |
|  | (c-2) | 10 | 14 | 7 | 10 | 20 | — | 30 | 47 | 10 | — | 10 | 16 |
|  | (d) | 3 | 3 | 3 | 8 | 3 | 3 | 3 | 3 | — | 3 | 3 | 3 |
| Converted amount ratio | (A) | 50 | 50 | 70 | 50 | 50 | 50 | 50 | 50 | 50 | 85 | 30 | 50 |
|  | (B) | 31.3 | 25.42 | 15.96 | 26.3 | 31.6 | 31 | 34.4 | 36.66 | 34.3 | — | 51.3 | 43.48 |
|  | (C-1) | 13.5 | 18.5 | 9.5 | 13.5 | 11 | 16 | 6 | — | 13.5 | 12 | 13.5 | — |
|  | (C-2) | 2.2 | 3.08 | 1.54 | 2.2 | 4.4 | — | 6.6 | 10.34 | 2.2 | — | 2.2 | 3.52 |
|  | (D) | 3 | 3 | 3 | 8 | 3 | 3 | 3 | 3 | — | 3 | 3 | 3 |

The polycarbonate resin compositions of Examples 1 to 5 and Comparative Examples 1 to 7 are evaluated as to Izod impact strength at room temperature/low temperature and appearance after painting. An evaluation method for each evaluation item is as follows, and results are shown in Table 2.

<Izod Impact Strength at Room Temperature>

Izod impact strength is measured on ⅛" thick notched Izod specimens prepared from the polycarbonate resin compositions of Example 1 to 5 and Comparative Examples 1 to 8 at 23° C. in accordance with ASTM D256.

<Izod Impact Strength at Low Temperature>

Izod impact strength is measured on ⅛" thick notched Izod specimens prepared from the polycarbonate resin compositions of Example 1 to 5 and Comparative Examples 1 to 7 at −30° C. in accordance with ASTM D256.

<Appearance after Painting>

A specimen having a size of 20 cm×5 cm×0.2 cm is prepared from each of the polycarbonate resin compositions of Example 1 to 5 and Comparative Examples 1 to 7 by injection molding at a predetermined injection rate and coated with a metal silver painting solution (VZ-21SV75, ECONET Co., Ltd.) using an air gun and then dried at 60° C. for 30 minutes, followed by observation of appearance of the specimen with the naked eye. After checking occurrence of appearance defects such as flow marks, erosions, and cracks, the specimen is rated as 10 when suffering no appearance defects, and the specimen is rated as 1 when exhibiting extremely poor appearance.

TABLE 2

|  | Example | | | | | Comparative Example | | | | | | |
|---|---|---|---|---|---|---|---|---|---|---|---|---|
| Evaluation item | 1 | 2 | 3 | 4 | 5 | 1 | 2 | 3 | 4 | 5 | 6 | 7 |
| Izod impact strength at room temperature | 60 | 65 | 60 | 60 | 60 | 60 | 45 | 20 | 58 | 70 | 40 | 30 |

TABLE 2-continued

| Evaluation item | Example | | | | | Comparative Example | | | | | | |
|---|---|---|---|---|---|---|---|---|---|---|---|---|
| | 1 | 2 | 3 | 4 | 5 | 1 | 2 | 3 | 4 | 5 | 6 | 7 |
| (kgf · cm/cm) Izod impact strength at low temperature (kgf · cm/cm) | 15 | 20 | 12 | 15 | 18 | 6 | 18 | 15 | 16 | 10 | 14 | 10 |
| Appearance after painting | 10 | 7 | 8 | 8 | 8 | 9 | 5 | 3 | 5 | 3 | 6 | 4 |

From the results shown in Tables 1 and 2, it can be seen that the polycarbonate resin compositions of Examples 1 to 5 exhibit excellent properties in terms of impact resistance at room temperature/low temperature and paintability.

In addition, it can be seen that the polycarbonate resin composition of Comparative Example 1, which includes only the (C-1) component of the acrylonitrile-butadiene-styrene graft copolymer (C), exhibits poor impact resistance at low temperature, and the polycarbonate resin composition of Comparative Examples 3 and 7, which include only the (C-2) component, exhibit poor properties in terms of impact resistance and appearance after painting. Thus, it is confirmed that the kind and amount of the acrylonitrile-butadiene-styrene graft copolymer (C) can have significant influence on impact resistance and paintability.

Further, the polycarbonate resin composition of Comparative Example 4, which did not include the compatibilizer (D), exhibits poor appearance after painting, and the polycarbonate resin composition of Comparative Example 5, which did not include the vinyl cyanide compound-aromatic vinyl compound copolymer (B), also exhibits poor appearance after painting.

Therefore, it can be seen that a polycarbonate resin composition having excellent properties in terms of impact resistance and paintability can be obtained using a polycarbonate resin, a vinyl cyanide compound-aromatic vinyl compound copolymer, acrylonitrile-butadiene-styrene graft copolymers having different average particle diameters, and a compatibilizer.

According to the present invention, it is possible to provide a polycarbonate resin composition which includes an acrylonitrile-butadiene-styrene graft copolymer, a vinyl cyanide compound-aromatic vinyl compound copolymer, and a compatibilizer in an optimized composition or amount and thus can considerably reduce defects of a resulting molded article, such as flow marks and weld lines, thereby improving paintability, and a molded article using the same.

In addition, according to the present invention, it is possible to provide a polycarbonate resin composition which includes acrylonitrile-butadiene-styrene graft copolymers, rubbery polymers of which have different average particle diameters, in a predetermined weight ratio and thus can improve appearance and paintability of a resulting molded article while maintaining excellent properties inherent to a polycarbonate resin, and a molded article using the same.

Further, according to the present invention, it is possible to provide a polycarbonate resin composition which can improve appearance and thus paintability of a resulting molded article and thus allows a painting process to be performed using a single painting layer without need for a typical double painting layer such as top/bottom painting layers, thereby simplifying the overall process and reducing related costs.

The present invention is not limited to the above effects and other effects will become apparent to those skilled in the art from the appended claims.

Although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. A polycarbonate resin composition comprising:
   (A) about 45 wt % to about 75 wt % of a polycarbonate resin;
   (B) about 10 wt % to about 40 wt % of a vinyl cyanide compound-aromatic vinyl compound copolymer;
   (C) about 10 wt % to about 25 wt % of an acrylonitrile-butadiene-styrene graft copolymer comprising (C-1) a first acrylonitrile-butadiene-styrene graft copolymer, a rubbery polymer of which has an average particle diameter of about 200 nm to about 350 nm and (C-2) a second acrylonitrile-butadiene-styrene graft copolymer, a rubbery polymer of which has an average particle diameter of about 400 nm to about 600 nm; and
   (D) about 3 wt % to about 9 wt % of a compatibilizer,
   wherein the acrylonitrile-butadiene-styrene graft copolymer (C) comprises the first acrylonitrile-butadiene-styrene graft copolymer (C-1) and the second acrylonitrile-butadiene-styrene graft copolymer (C-2) in a weight ratio of about 1:0.1 to about 1:0.7.

2. The polycarbonate resin composition according to claim 1, wherein, in the vinyl cyanide compound-aromatic vinyl compound copolymer (B), the vinyl cyanide compound comprises acrylonitrile, methacrylonitrile, fumaronitrile, or a combination thereof.

3. The polycarbonate resin composition according to claim 1, wherein, in the vinyl cyanide compound-aromatic vinyl compound copolymer (B), the aromatic vinyl compound comprises styrene, α-methylstyrene, halogen or alkyl-substituted styrene, or a combination thereof.

4. The polycarbonate resin composition according to claim 1, wherein the vinyl cyanide compound-aromatic vinyl compound copolymer (B) is a styrene-acrylonitrile copolymer (SAN).

5. The polycarbonate resin composition according to claim 1, wherein the vinyl cyanide compound-aromatic vinyl compound copolymer (B) is copolymerized from a mixture of an aromatic vinyl compound and a vinyl cyanide compound, wherein the mixture includes the aromatic vinyl compound in an amount of about 60 wt % to about 80 wt %, based on the total weight of the mixture.

6. The polycarbonate resin composition according to claim 1, wherein the vinyl cyanide compound-aromatic vinyl compound copolymer (B) has a weight average molecular weight of about 70,000 g/mol to about 400,000 g/mol.

7. The polycarbonate resin composition according to claim 1, comprising the second acrylonitrile-butadiene-styrene graft copolymer (C-2) in an amount of about 1 wt % to about 10 wt % based on the total weight of the polycarbonate resin composition.

8. The polycarbonate resin composition according to claim 1, wherein the compatibilizer (D) is a copolymer of a (meth)acrylic compound and a compound copolymerizable with the (meth)acrylic compound.

9. The polycarbonate resin composition according to claim 1, wherein the compatibilizer (D) comprises a copolymer of ethyl acrylate and methyl methacrylate.

10. The polycarbonate resin composition according to claim 9, wherein the compatibilizer (D) comprises a (meth) acrylic copolymer copolymerized from a mixture including about 30 wt % to about 70 wt % of ethyl acrylate and about 70 wt % to about 30 wt % of methyl methacrylate.

11. A molded article manufactured from the polycarbonate resin composition according to claim 1.

12. The polycarbonate resin composition according to claim 1, wherein a molded article manufactured from the polycarbonate resin composition has a notched Izod impact strength at room temperature of 60 to 65 kgf·cm/cm measured in accordance with ASTM D256.

13. The polycarbonate resin composition according to claim 12, wherein a molded article manufactured from the polycarbonate resin composition has a notched Izod impact strength at −30° C. of 12 to 20 kgf·cm/cm measured in accordance with ASTM D256.

14. The polycarbonate resin composition according to claim 13, wherein the acrylonitrile-butadiene-styrene graft copolymer (C) comprises the first acrylonitrile-butadiene-styrene graft copolymer (C-1) and the second acrylonitrile-butadiene-styrene graft copolymer (C-2) in a weight ratio of about 1:0.1 to 1:0.4.

\* \* \* \* \*